April 29, 1941.      A. A. LINCOLN      2,239,851
SHEARS
Filed July 29, 1939
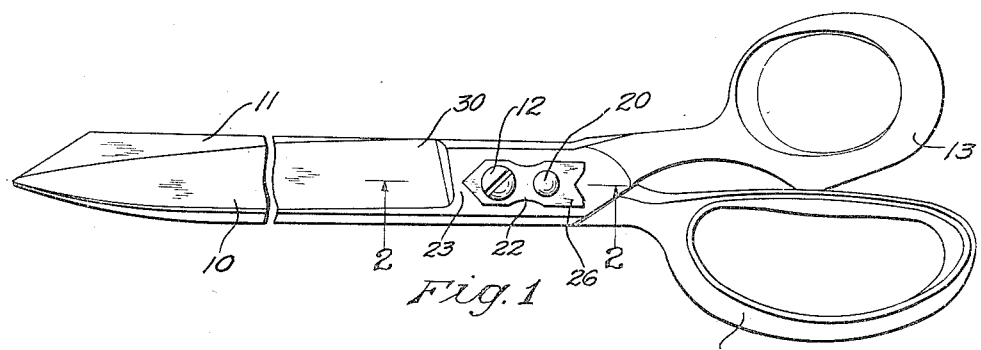
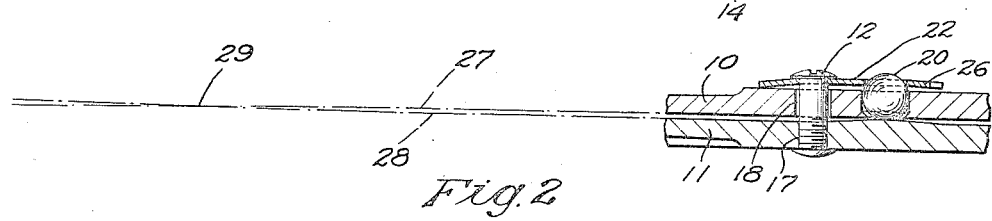
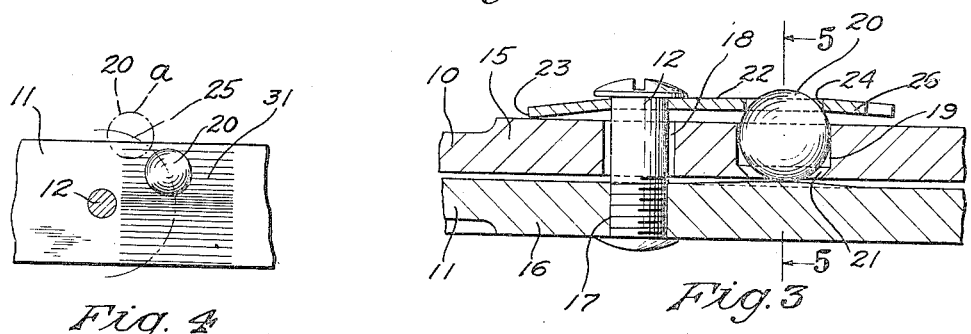
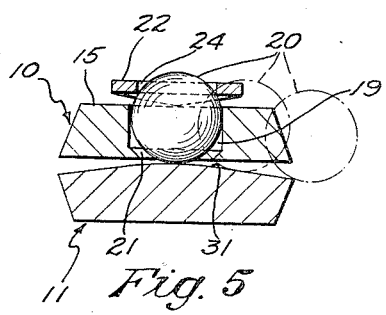
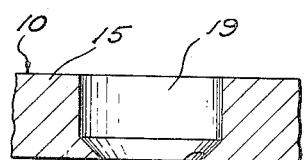
INVENTOR
Alden A. Lincoln
BY
Wooster & Davis
ATTORNEYS Patented Apr. 29, 1941

2,239,851

UNITED STATES PATENT OFFICE 2,239,851

SHEARS

Alden A. Lincoln, Bridgeport, Conn., assignor to The Acme Shear Company, Bridgeport, Conn., a corporation of Connecticut Application July 29, 1939, Serial No. 287,202

3 Claims. (Cl. 30—268)

This invention relates to shears, and has for an object to provide smoother, easier and more uniform operation of the shears by equalizing the tension between the two cutting edges throughout the entire length of the cut.

Another object is to provide automatic means operated by relative turning movement of the blades on their pivot to increase the pressure tending to hold the blades together as the point of contact between the cutting edges moves outwardly away from the pivot as the blades move toward closed position, to thus maintain more even pressure between the blades as this cutting point moves outwardly and the leverage thereof from the pivot increases.

With the foregoing and other objects in view I have devised a construction illustrated in the accompanying drawing forming a part of this specification, but it will be understood that various changes and modifications may be employed within the scope of the invention.

In this drawing:

Fig. 1 is a side elevation of a pair of shears with this improvement applied thereto, the blades being shown in closed position;

Fig. 2 is a longitudinal section substantially on line 2—2 of Fig. 1;

Fig. 3 is a similar section but on a larger scale;

Fig. 4 is a plan view of a portion of the lower blade adjacent the pivot showing the path of movement of the ball thereon;

Fig. 5 is a transverse section substantially on line 5—5 of Fig. 3; and

Fig. 6 is a section on an enlarged scale through the mounting recess for the ball.

The shears shown comprises a pair of blades 10 and 11 pivoted together by a rivet or other suitable pivot 12 and the blades including the usual handles comprising the thumb and finger loops 13 and 14 with the intermediate ride portions 15 and 16 between the blade cutting portions or blades proper and the handles. The pivot 12 is fast in the blade 11 as shown at 17, and the opening 18 in the upper blade 10 is somewhat larger than the pivot 12 so that the blade 10 can rock a certain amount on the pivot. The ride portion of the blade 10 on the opposite side of the pivot from the cutting edges has an opening or recess 19 opening from the top surface thereof, but passing through the blade to receive a steel ball 20. This opening or recess at its lower end has a shoulder 21 which will limit the movement of the ball downwardly through the blade and will prevent the ball dropping out when the blades are opened wide enough to permit the ball to pass off the lower blade 11. This shoulder, however, will permit the ball to project below the lower surface of the blade 10 somewhat to press on the top surface of the lower blade 11.

A spring plate 22 is mounted under the head of the pivot 12, the plate having an opening through which the pivot passes and its forward end 23 rests on the top surface of the blade 10. To give a better appearance this plate is preferably made in the general shape of an arrow as shown, but this is not necessary as it may be made of other shapes if desired. The engagement point 23 on the blade 10 is between the pivot and the cutting portion of the blade. At the opposite side of the pivot from the point 23 and the cutting edges of the blades this spring is provided with a seat for the ball 20. In the present showing this comprises an opening 24 through the plate of a less diameter than the larger diameter of the ball so that the ball cannot pass through the plate, but the seat could be formed in other ways, as for example by pressing a recess in the lower face of the plate, or if the spring 22 is held against turning on the blade 10 no seat would be required. It will be seen therefore that when under tension the spring 22 tends to press the ball downwardly toward the shoulder 21 and against the surface of the lower blade 11. Also, because of the leverage action of the spring between the head of the pivot 12 and the point 23 this spring tends to rock the blade 10 on its pivot and press the cutting edges of the blades together, and it will be evident that the greater the tension of the spring the greater will be this tendency to rock the blade 10 and to press the cutting edges together.

It will therefore be seen from Fig. 4 that as the shears are opened and closed by turning of the blades about the pivot 12 the ball 20 will move about this pivot on the circular line 25. When the blades are wide open the ball is at the position (a) and has run off the lower blade 11 so that there is no pressure of the spring 22 on to the blade 11 as in this position the ball is supported by the shoulder 21. When the blades are moved toward the closed position the ball moves along the path of line 25 on to the top of the blade 11. As it does so it presses on the surface of this blade pushing the ball upwardly and raising the right hand end 26 of the spring 22 to increase the tension on this spring and to thus increase the pressure of the spring on the blade 10 at the front end 23 of the spring. The shoulder 21 by insuring that the ball cannot drop from the recess when the blades are fully open permits placing of the ball a greater distance from the pivot thus giving more leverage.

To insure that the cutting edges of the blades remain in contact throughout the entire relative turning movements of the blades about the pivot the cutting portions of the blades are given a set so that they are somewhat concaved at their inner sides or at the side toward the other blade. This is represented by the dot and dash lines in Fig. 2, the line 27 representing the set for the cutting edge of the upper blade 10 and the line 28 representing the set for the cutting edge of the lower blade 11. When the blades are partly opened these lines appear to cross at the point of contact of the cutting edges which is the point of cutting during the operation of the shears. In Fig. 2 this is indicated at the point 29 which as shown is adjacent the points of the shears where it would be when the shears are nearly closed or open only a short distance, but of course as the shears are operated this point of contact between the cutting edges moves along these edges, and as the shears are moved from the wide open to the closed position it moves along the edges from a point a short distance in front of the pivot, or that is from the heels of the cutting edges at about the points 30 to the outer ends or points of the shear blades.

It will be evident that unless this set is very accurately made the pressure between the cutting edges of the blades will vary as the point of contact moves outwardly away from the pivot, and thus the operation of cutting will not be uniform throughout the lengths of the blades. It is a difficult operation to properly set the blades to secure this uniform pressure and uniform action. With the present construction, however, it will be seen that as the contact point 29 moves outwardly away from the pivot as the blades move toward closed position this set or curvature in the blades will tend to rock the blades relatively to each other, or that is, will tend to separate the cutting portions of the blades. It will be evident that the effect of this in the present construction will be to raise the outer end of the upper blade 10 and rock this blade on the pivot 12. This rocking movement will tend to press the ball 20 more firmly against the lower blade 11 and will thus increase the tension on the spring 22. This increased tension on the spring will increase the pressure of the spring tending to press the cutting edges together, but as the point 29 moves outwardly away from the pivot the leverage of the pressures at this point is increased so that the actual pressure between the cutting edges at their point of contact remains substantially uniform throughout the full length of the cutting edges. To give a greater and more positive compensating effect the top surface of the blade 11 is provided with a rising cam surface 31 under the ball 20 so that as this ball rides on to the blade pressure gradually increases the farther the blades are closed and the farther the ball rides on to this cam surface. This gradually increases the pressure between the blade 11 and the spring 22 as the blades move toward closed position during the cutting operation, and thus gradually increases the tension of the spring 22 during this movement and therefore tends to increase the tendency of the spring 22 to press the cutting edges of the blades together as the point of contact and cutting 29, Fig. 2, between these cutting edges moves outwardly during the cutting operation. The showing of the cam surface 21 is exaggerated on the drawing for more clear illustration, but in actual practice a relatively small rise is all that is required.

It will therefore be seen that with this construction it is not necessary to secure as accurate a set or curvature to the blades to secure smooth and uniform operation, as the spring 22 and the ball, either with or without the cam 31, will automatically compensate for the change in leverage at the cutting point and maintain a more uniform pressure between the cutting edges of the blades throughout the entire lengths of these cutting edges and the cutting operation as the blades are moved toward closed position. This thus gives a smoother and more uniform operation. Also, as the ball 20 rolls on the surface of the lower blade 11 it produces less friction than where there is merely a rubbing action thus providing a sort of antifriction bearing between the blades, giving a smoother and easier operation as well as giving an equalized tension between the two cutting edges throughout the entire length of the cut. In other words a more uniform pressure is secured throughout the cutting length of the blade, and the ball and its associated parts automatically compensates for the differences in distance of the contact point 29 between the blades from the pivot as this contact point moves outwardly. Also, the spring ball arrangement compensates for the tendency of the blades to move apart or separate toward their outer ends or points due to a certain spring in the blades, and the ball tensions the spring 22 to add additional pressure to give greater resistance to separation of the blades as this contact point between them moves outwardly and its leverage with respect to the pivot increases.

Having thus set forth the nature of my invention, what I claim is:

1. A shear comprising a pair of pivoted blades having contacting cutting edges curved longitudinally of the blades with the concave sides at the inner and contacting edges, one of said blades being loosely mounted on the pivot for limited lateral rocking movement and spaced a short distance from the other blade at said pivot, a spring plate mounted on the pivot and having one end engaging the outer surface of the latter blade between the pivot and the cutting edges so that when tensioned it tends to press the cutting edges laterally together, said blade having a transverse recess on the opposite side of the pivot, a ball in said recess engaging the spring and the adjacent surface of the other blade, and an inclined cam surface on the second blade on which the ball rolls as the blades are swung about the pivot and arranged to gradually increase the pressure of the spring on the first blade as the blades move toward closed position and the point of contact between their cutting edges moves outwardly away from the pivot.

2. A shear comprising a pair of blades pivoted together for opening and closing movement, the cutting portion of said blades having a set so that they have a lateral longitudinal curvature with the concave side at the inner and contacting edges of the blades, one of said blades being loosely mounted on the pivot for limited lateral rocking movement, a spring tending to rock the latter blade on the pivot to press the cutting edges together, and means made effective by relative turning movements of the blades for increasing the tension on the spring as the point of contact between the cutting edges moves outwardly away from the pivot as the blades move toward closed position, comprising a bearing member under the spring and an inclined cam on the other blade on which said member runs.

3. A shear comprising a pair of blades pivoted together for opening and closing movement, the cutting portion of said blades having a set so that they have a lateral longitudinal curvature with the concave side at the inner and contacting edges of the blades, one of said blades being loosely mounted on the pivot for limited lateral rocking movement, a spring on the pivot extending in opposite directions therefrom and engaging the latter blade between the pivot and its cutting edge so as to tend to rock the blade on the pivot to press the cutting edges together, and means so cooperating with the spring that as the point of contact between the cutting edges moves outwardly away from the pivot as the blades turn on the pivot toward closed position the resulting action increases the tension of the spring, comprising an inclined cam surface on the other blade and a member in the rocking blade running on said cam surface and pressing against the extension of said spring on the side of the pivot opposite the cutting edges.

ALDEN A. LINCOLN.